US012755344B2

(12) United States Patent
Damiano et al.

(10) Patent No.: US 12,755,344 B2
(45) Date of Patent: Oct. 6, 2026

(54) INFERENCE OF BRIGHT FLAT-FIELD CORRECTION BASED ON SCAN RADIOGRAPHS

(71) Applicant: Lumafield, Inc., Cambridge, MA (US)

(72) Inventors: Adam P. Damiano, San Francisco, CA (US); Kevin David Cedrone, Boxborough, MA (US)

(73) Assignee: Lumafield, Inc., Cambridge, MA (US)

( * ) Notice: Subject to any disclaimer, the term of this patent is extended or adjusted under 35 U.S.C. 154(b) by 311 days.

(21) Appl. No.: 18/526,889

(22) Filed: Dec. 1, 2023

(65) Prior Publication Data

US 2024/0185395 A1 Jun. 6, 2024

Related U.S. Application Data

(60) Provisional application No. 63/429,209, filed on Dec. 1, 2022.

(51) Int. Cl.
*G06T 5/50* (2006.01)
*G01N 23/046* (2018.01)
*G01N 23/083* (2018.01)

(52) U.S. Cl.
CPC ............. *G06T 5/50* (2013.01); *G01N 23/046* (2013.01); *G01N 23/083* (2013.01);
(Continued)

(58) Field of Classification Search
CPC ............. G06T 5/50; G06T 2207/10081; G06T 2207/10116; G06T 2207/20221; G06T 2207/10024; G06T 5/90; G06T 2207/20036; G06T 11/003; G06T 7/60; G06T 7/0012; G06T 11/006; G06T 2207/10016; G06T 2207/10084; G06T 2207/20201; G06T 5/73; G06T 7/0014; G01N 23/046; G01N 23/083;
(Continued)

(56) References Cited

U.S. PATENT DOCUMENTS

2021/0121143 A1 * 4/2021 Iniewski ................ A61B 6/585

FOREIGN PATENT DOCUMENTS

EP 1403818 A1 * 3/2004 ........... H04N 25/672
JP H10133309 A * 5/1998 ............. G06T 5/005
(Continued)

OTHER PUBLICATIONS

TomRoelandts.com, [online] "Reconstruction of a Real Dataset, Part 2: Flat Field Correction," Apr. 26, 2021, retrieved from URL<https://tomroelandts.com/articles/reconstruction-of-a-real-dataset-part-2-flat-field-correction.>, 4 pages.
(Continued)

*Primary Examiner* — Jose L Couso
(74) *Attorney, Agent, or Firm* — Fish & Richardson P.C.

(57) ABSTRACT

Systems, methods, apparatuses, and computer program products for nonintrusive scanning of objects using X-ray electromagnetic radiation. One method can include generating at least one two-dimensional X-ray radiograph image; generating synthetic flat field data using the at least one two-dimensional X-ray radiograph image, a second two-dimensional X-ray radiograph image, or both; and applying flat field image correction using the synthetic flat field data to the at least one two-dimensional X-ray radiograph image.

20 Claims, 11 Drawing Sheets

(52) U.S. Cl.
CPC .................. *G01N 2223/505* (2013.01); *G06T 2207/10081* (2013.01); *G06T 2207/10116* (2013.01); *G06T 2207/20221* (2013.01)

(58) Field of Classification Search
CPC ........... G01N 2223/505; A61B 6/5217; A61B 6/544; A61B 6/583; A61B 6/032; A61B 2090/364; A61B 2576/00; A61B 5/0035; A61B 5/721; G01B 15/025; G16H 30/40; G01T 1/08; G01T 1/169
See application file for complete search history.

(56) References Cited

FOREIGN PATENT DOCUMENTS

| | | | | | |
|---|---|---|---|---|---|
| JP | 2001299736 | A | * | 10/2001 | ............. A61B 6/583 |
| JP | 2021-013726 | A | | 2/2021 | |
| TW | 201333883 | A | * | 8/2013 | ............. G06V 10/28 |
| WO | WO-2022251701 | A1 | * | 12/2022 | ........... A61B 6/5205 |

OTHER PUBLICATIONS

Martz et al., X-Ray Imaging: Fundamentals, Industrial Techniques and Applications, 1st ed., Aug. 22, 2016, Chapter 13.7.2 Ring artifact correction, pp. 308-309.
Cobos et al., "High-dynamic-range micro-CT for nondestructive testing of titanium 3D-printed medical components," Journal of Medical Imaging, Jul. 1, 2022, 9(4): 44004, 13 pages.
International Search Report and Written Opinion in International Appln. No. PCT/US2023/082100, mailed on Apr. 16, 2024, 15 pages.
Nieuwenhove et al., "Dynamic intensity normalization using eigen flat fields in X-ray imaging," Optics Express, Oct. 15, 2015, 23(21): 27975-27989.
Office Action in Japanese Appln. No. 2025-531217, mailed on Oct. 21, 2025, 5 pages (with English translation).
Covault et al., "Techniques for Removing Non-uniform Background in Coded- Aperture Imaging on the Energetic X-ray Imaging Telescope Experiment," IEEE Transactions on Nuclear Science, Apr. 1991, 38(2):591-596.
Office Action in Korean Appln. No. 10-2025-7021292, dated Apr. 15, 2026, 14 pages (with English Translation).
Zheng et al., "Single-Image Vignetting Correction," 2006 IEEE Computer Society Conference on Computer Vision and Pattern Recognition (CVPR'06), Jul. 2006, 8 pages.

* cited by examiner

900

INFERENCE OF BRIGHT FLAT-FIELD CORRECTION BASED ON SCAN RADIOGRAPHS

CROSS-REFERENCE TO RELATED APPLICATION

This patent application claims priority to and the benefit of U.S. Provisional Patent Application No. 63/429,209, filed on Dec. 1, 2022.

TECHNICAL FIELD

Some example embodiments can generally relate to the detection of X-ray electromagnetic radiation using scanning devices, scintillators, and X-ray sources. For example, certain example embodiments can relate to systems and/or methods for nonintrusive scanning of objects using X-ray electromagnetic radiation.

BACKGROUND

X-ray devices, such as computed tomography (CT) devices, can be used to detect defects and/or damage in an object without disassembling the object. However, existing X-ray detection equipment is in need of improvements because it can be cost-prohibitive for certain analyses, too large or bulky to be used in certain situations, unable to form images of an object's interior with the appropriate resolution, or other problems known in the field. Set forth herein are solutions to these and other problems known in the field.

SUMMARY

In accordance with certain example embodiments, a method can include generating at least one two-dimensional X-ray radiograph image. The method can further include applying flat field image correction using synthetic flat field data to the at least one two-dimensional X-ray radiograph image.

In accordance with some example embodiments, an apparatus can include means for generating at least one two-dimensional X-ray radiograph image. The apparatus can further include means for applying flat field image correction using synthetic flat field data to the at least one two-dimensional X-ray radiograph image.

In accordance with various example embodiments, a non-transitory computer readable medium can include program instructions that, when executed by an apparatus, cause the apparatus to perform at least a method. The method can include generating at least one two-dimensional X-ray radiograph image. The method can further include applying flat field image correction using synthetic flat field data to the at least one two-dimensional X-ray radiograph image.

In accordance with certain example embodiments, a computer program product can perform a method. The method can include generating at least one two-dimensional X-ray radiograph image. The method can further include applying flat field image correction using synthetic flat field data to the at least one two-dimensional X-ray radiograph image.

In accordance with some example embodiments, an apparatus can include at least one processor and at least one memory storing instructions that, when executed by the at least one processor, cause the apparatus at least to generate at least one two-dimensional X-ray radiograph image. The at least one memory and instructions, when executed by the at least one processor, can further cause the apparatus at least to apply flat field image correction using synthetic flat field data to the at least one two-dimensional X-ray radiograph image.

In accordance with various example embodiments, an apparatus can include circuitry configured to generate at least one two-dimensional X-ray radiograph image. The apparatus circuitry can further apply flat field image correction using synthetic flat field data to the at least one two-dimensional X-ray radiograph image.

In certain example embodiments, the synthetic flat field data can include at least one of non-synthetic data, incomplete data, partial data, and incorrect data.

In some example embodiments, the synthetic flat field data can include data generated from a plurality of tests.

In various example embodiments, the synthetic flat field data can include at least one of assembled data and directly collected data.

In certain example embodiments, the synthetic flat field data can include inferred data.

In some example embodiments, the inferred synthetic flat field data can include data inferred from at least one portion of a radiograph for empty field, and a predefined property associated with a representative field.

In various example embodiments, the synthetic flat field data can include completely direct data, completely synthetic data, or a combination of direct data and synthetic data.

In certain example embodiments, the synthetic flat field data can include at least one dark field image, at least one bright field image, or a combination thereof.

In some example embodiments, the synthetic flat field data can be associated with at least one of a low brightness condition, a low sensitivity condition, and a time of day condition.

In various example embodiments, the synthetic flat field data can include at least one pixel linearly sensitive to visible light.

In certain example embodiments, the synthetic flat field data can be configured for pixelated correction.

BRIEF DESCRIPTION OF THE DRAWINGS

For a proper understanding of example embodiments, reference should be made to the accompanying drawings, wherein.

DETAILED DESCRIPTION

Flat field correction (FFC) is a correction process in which radiographs can be captured without a scan object present in the image, and can be used to correct radiograph(s) captured with scan objects present in the image. FFC can normalize these radiographs to the same intensity value as when no scan object appears in the radiograph. The flat field image can change based on scan set up parameters and temporal drift and, therefore, is traditionally recaptured for each scan. However, collecting these additional FFC images can require additional time to complete the total scan. This can also require moving the scan object beyond the range of the detector, potentially resulting in an increase of the envelope of the scanner (i.e., size of the scanner enclosure), and can lead to disadvantages such as unexpected physical collisions of the scan object with the interior of the scanner, resulting in movement of the scan object, damage to the scan object, and/or damage to the scanning device.

Certain example embodiments described herein can have various benefits and/or advantages to overcome the disadvantages described above. For example, some example embodiments can improve the quality and efficiency of FFC. In addition, various example embodiments can provide faster scans, smaller scanners, reconstructions with increased material density accuracy, reductions in ring artifacts, fewer user requirements, and FFC error correction. Thus, various example embodiments discussed below are directed to improvements in computer-related technology.

Some example embodiments discussed herein relate to a technique for inferring FFC information from the scan of an object, without requiring any additional radiographs to be captured without the scan object present. In general, flat field non-uniformity can be caused from a low-spatial-frequency intensity drop-off caused by camera vignetting (i.e., reducing image brightness or saturation toward the periphery of the image) and radial flux drop-off from the source, as well as a high-spatial-frequency fixed pattern noise caused by the differences in pixel response from pixel to pixel. Various example embodiments for inferring the FFC can treat these two sources of flat field non-uniformity separately and differently, and can reduce or eliminate the flat field non-uniformity differently.

Figure 1:
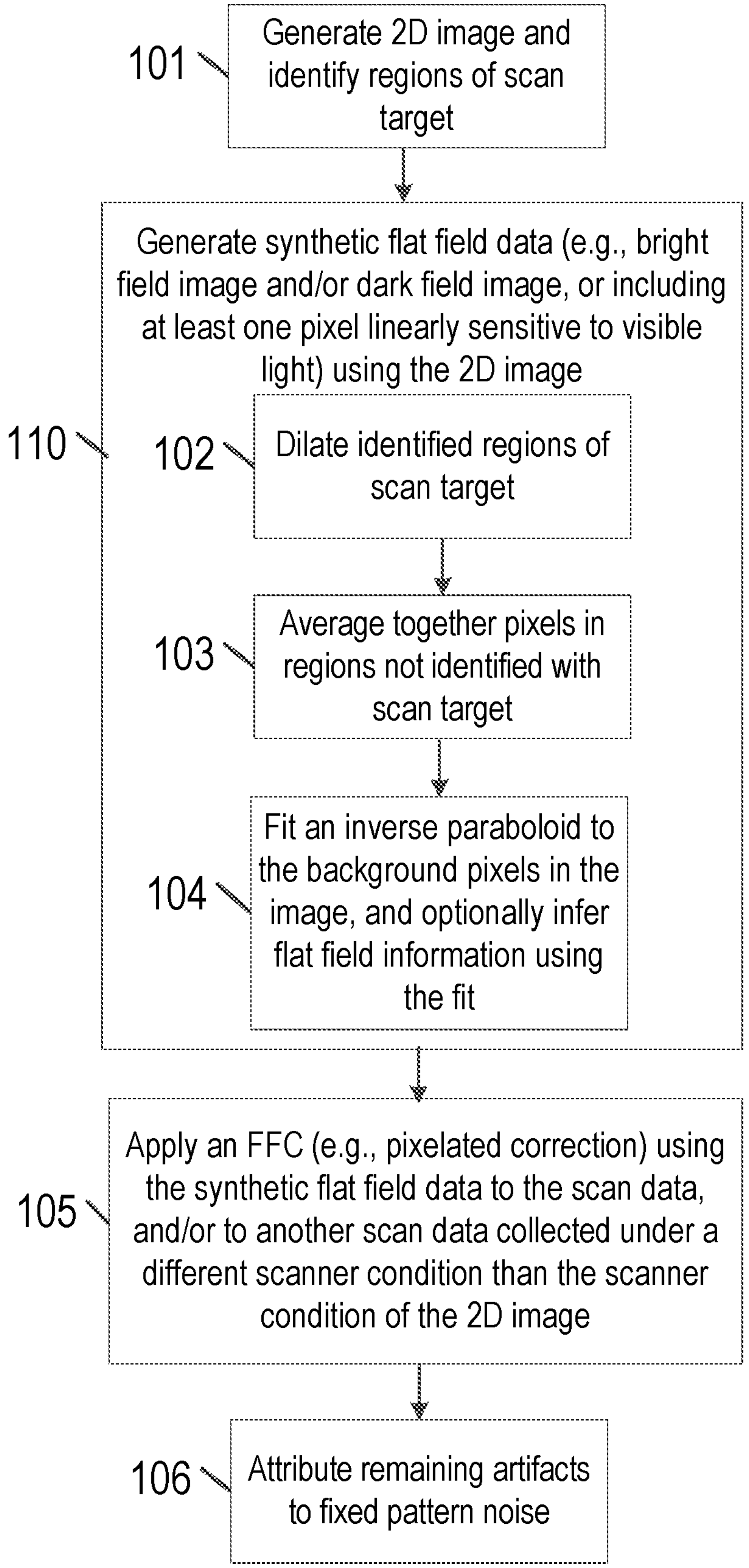
FIG. 1 illustrates an example of a flow diagram of a method according to certain example embodiments.
Figure 5:
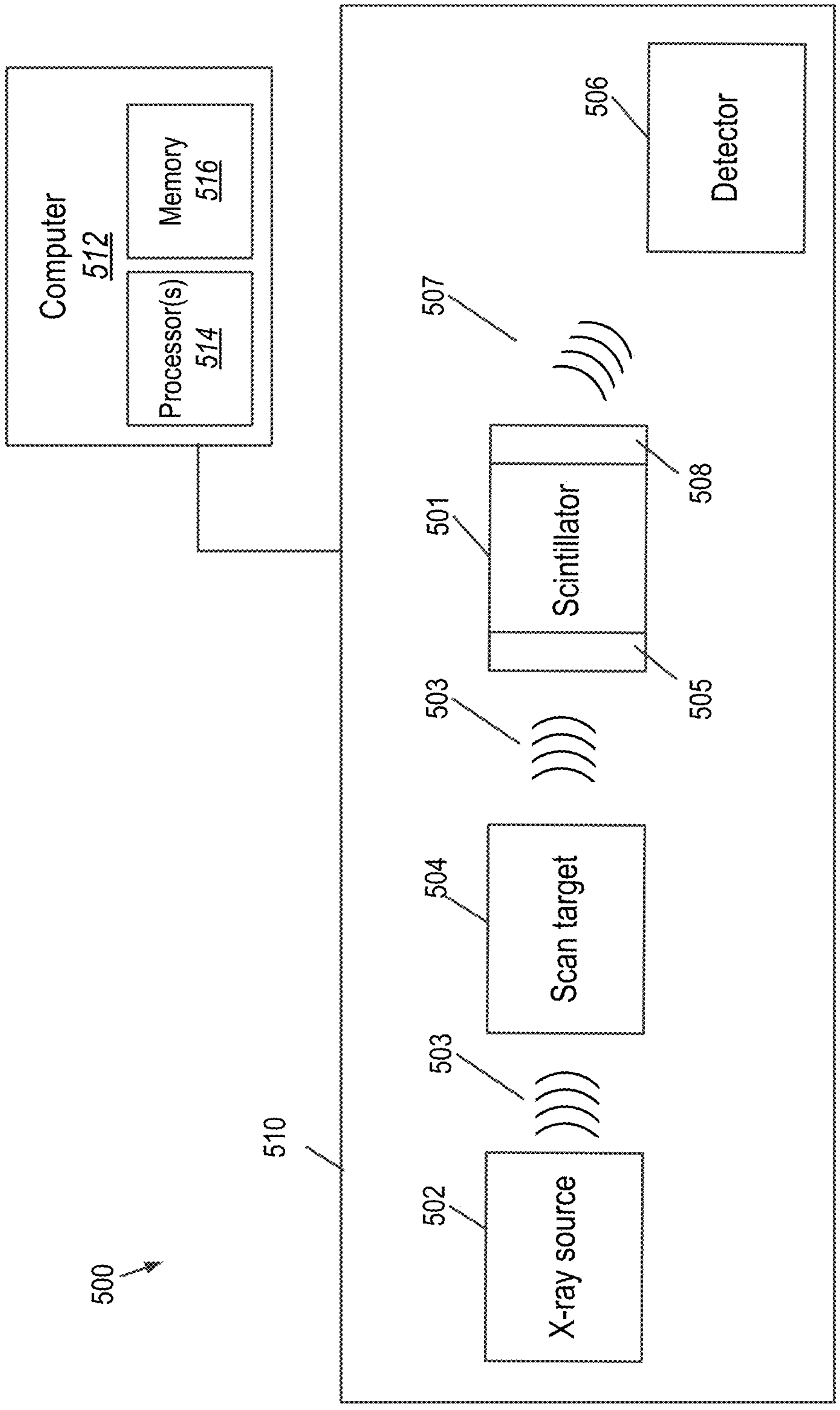
FIG. 5 illustrates an example of an X-ray imaging system according to some example embodiments.

FIG. 1 illustrates an example of a flow diagram of a method that can be performed by an X-ray imaging system, such as a CT scanning device and/or an X-ray imaging system 500 illustrated in FIG. 5, according to various example embodiments. In some example embodiments, the X-ray imaging system and/or scanning device can be configured to perform CT scans by obtaining and combining a plurality of X-ray images (i.e., frames) of a scan object, such as an asthma inhaler. However, multiple types of multiple parts can be scanned at the same time independently of source settings, detector settings, etc. In general, at the beginning of the scan, a motion stage can move to a predefined position that, for most objects, can move the object out of the field of view of a detector. A plurality of images (e.g., 30 images) can be captured and combined to produce a flat field image. Once the flat field image has been produced, the motion stage can return to the scan position and the scan can begin.

Figure 2:
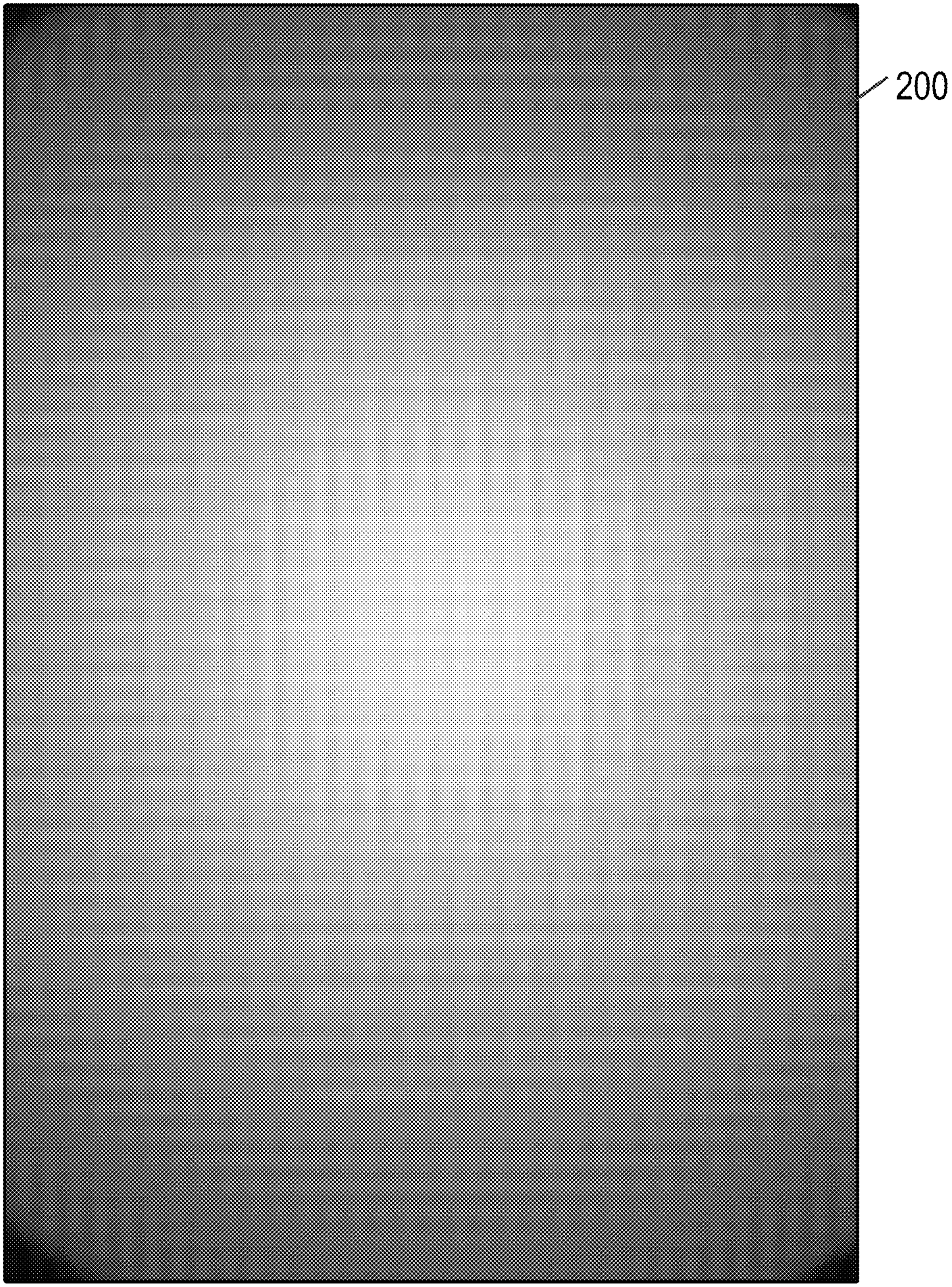
FIG. 2 depicts a flat field image with no object present.
Figure 3:
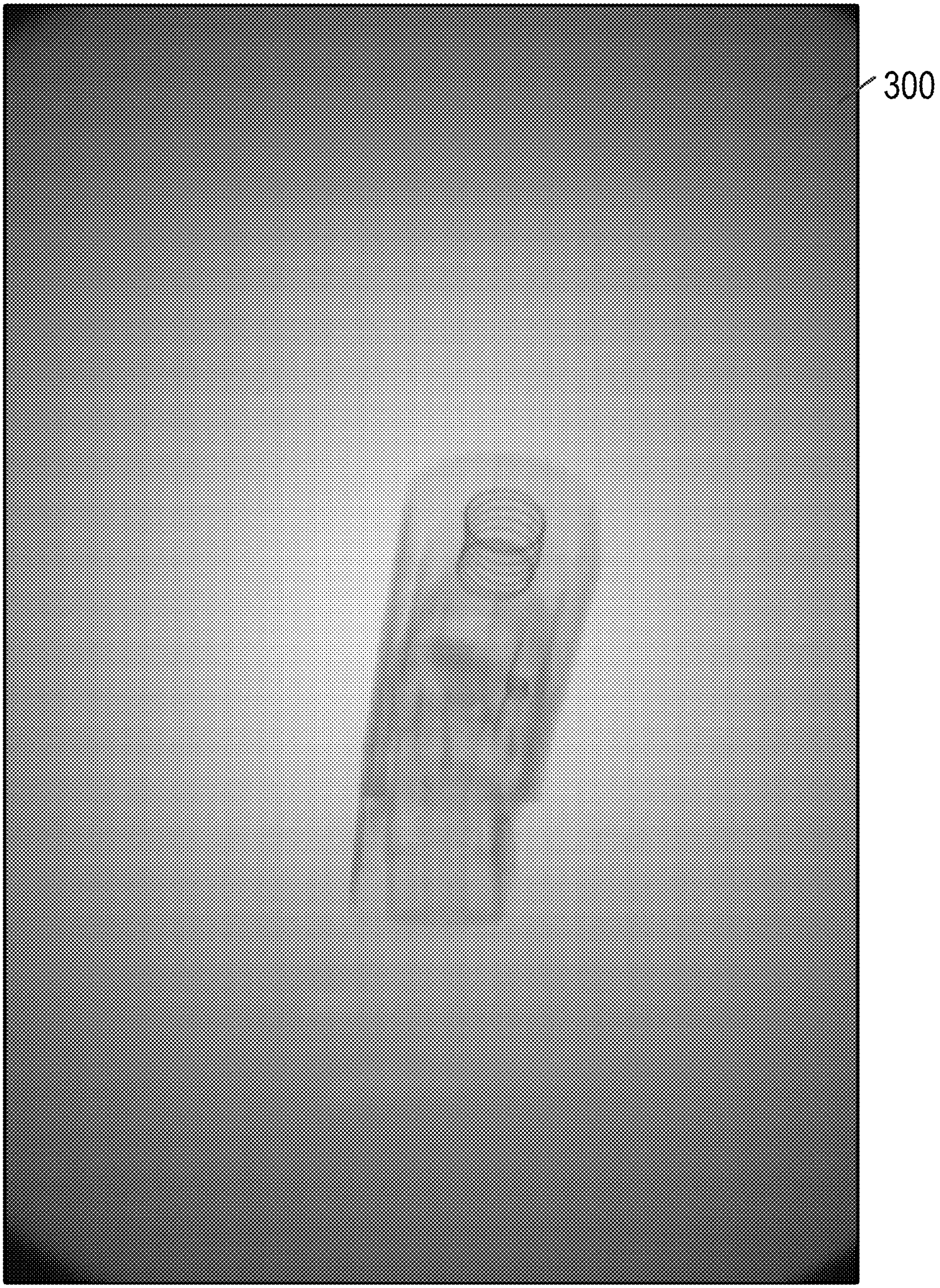
FIG. 3 depicts an uncorrected image from a CT scan of an asthma inhaler.

At 101, the method can include generating at least one two-dimensional X-ray radiograph image. For each generated radiograph, the method can include identifying one or more regions in each radiograph as corresponding with background (i.e., no asthma inhaler) (as shown in a radiograph 200 of FIG. 2), and one or more regions in each radiograph as corresponding with a scan object (i.e., asthma inhaler) (as shown in a radiograph 300 of FIG. 3). The identification can be performed using thresholding and/or machine learning.

At 110, the method can further include generating synthetic flat field data using the at least one two-dimensional X-ray image. In some implementations, the synthetic flat field data can include a bright field image, dark field image, or a combination of both. In some implementations, the synthetic flat field data can include at least one pixel that is linearly sensitive to visible light. In some implementations, the operations in 110 can include the operations in 102, 103, and 104. At 102, the method can further include dilating the one or more regions identified as corresponding with the scan object (as determined at 101) by adding a margin of error. For example, identification of the part compared against the background can be distorted. In some cases, the method can identify a boundary that is too small, causing a portion of the part to be included. Although some of the regions identified as the scanned part can contain some background, the method can only identify the region identified as the background without any portion of the scanned part. To avoid this distortion, the boundary between the scanned part and background can be morphologically dilated to make the boundary larger, thereby increasing the probability that regions of the radiograph identified as background are in fact background.

Figure 6:
FIG. 6 depicts a radiograph of an impact driver.
Figure 7:
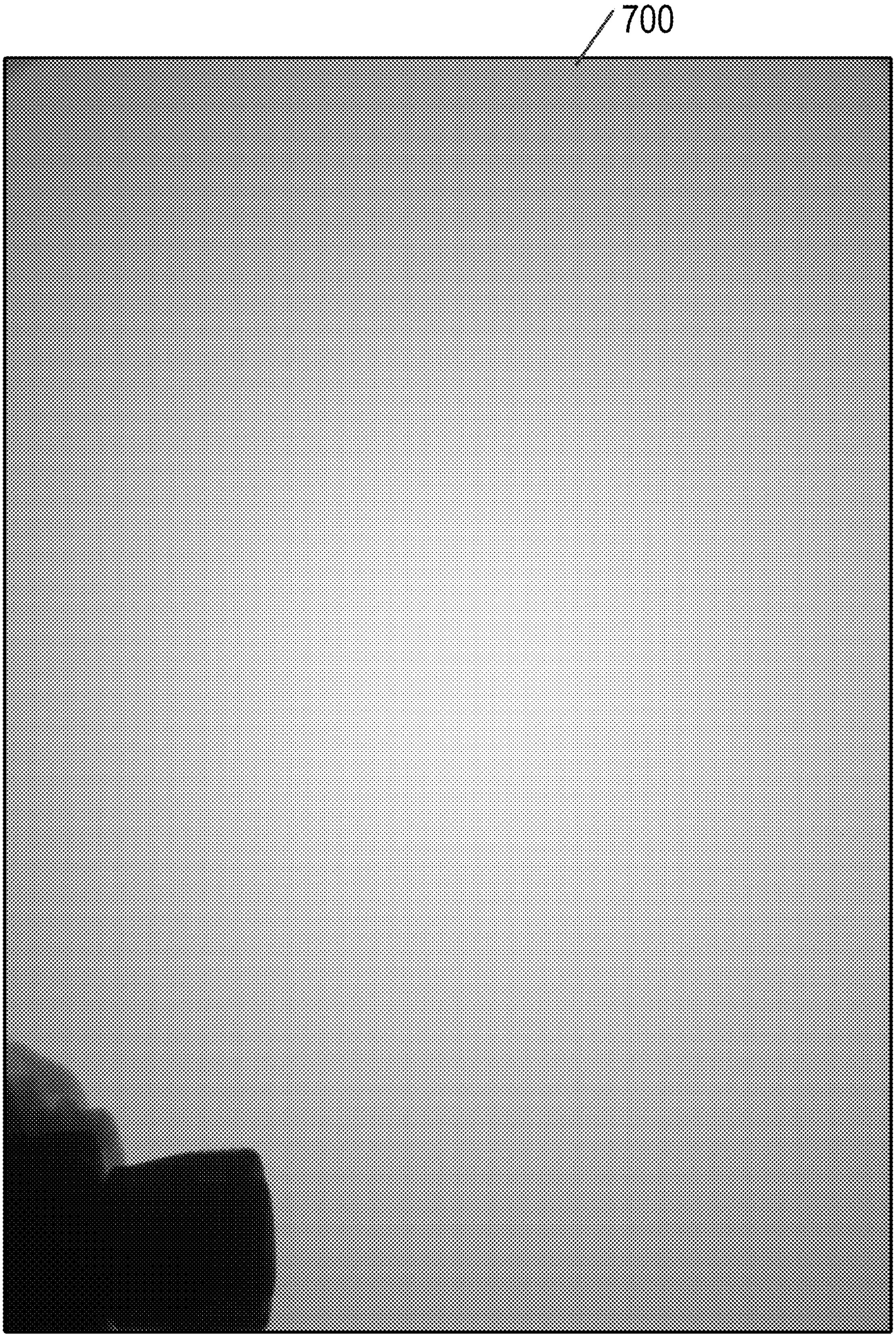
FIG. 7 depicts an attempted flat field correction image.
Figure 8:
FIG. 8 depicts a flat field correction of the radiograph of FIG. 6 using the flat field correction image of FIG. 7.

As an example, FIG. 6 depicts a radiograph 600 of an impact driver, which can be in the frame of the radiograph during FFC. Similarly, FIG. 7 depicts an attempted flat field correction image 700 with a defect caused by one or more limitations (e.g., spatial and/or size limitations) of the X-ray scanner. For example, the part is still partially in the view of the detector, e.g., at the lower left corner of the view of the detector, because there is not enough space inside the X-ray scanner to move the part completely outside the view of the detector due to the size of the X-ray scanner. FIG. 8 depicts a flat field correction of the radiograph 600 of FIG. 6 using the attempted flat field correction image 700 of FIG. 7, with saturated pixels in the bottom left corner of the flat field corrected radiograph 800 of FIG. 8.

Figure 9:
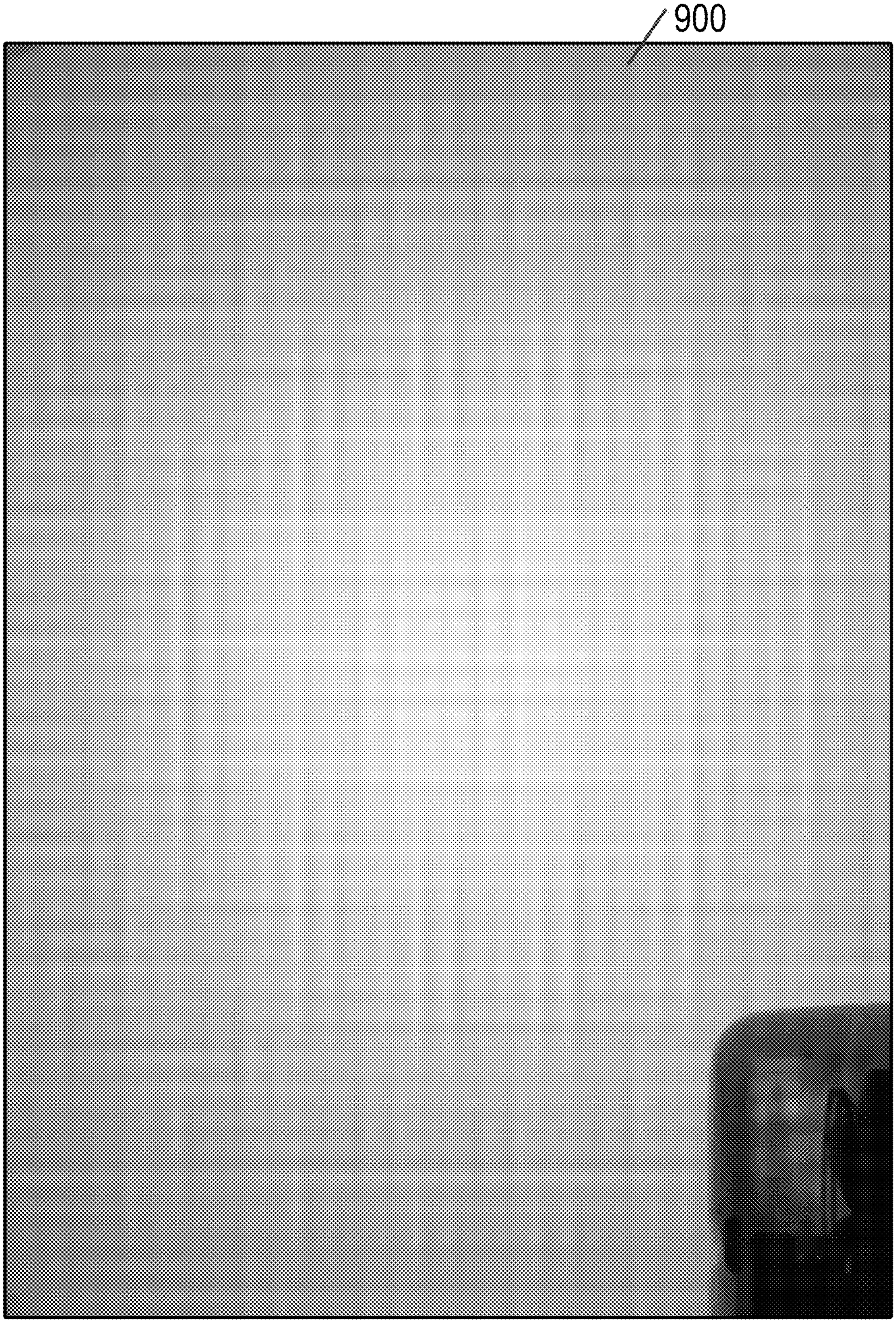
FIG. 9 depicts another attempted flat field correction image.
Figure 10:
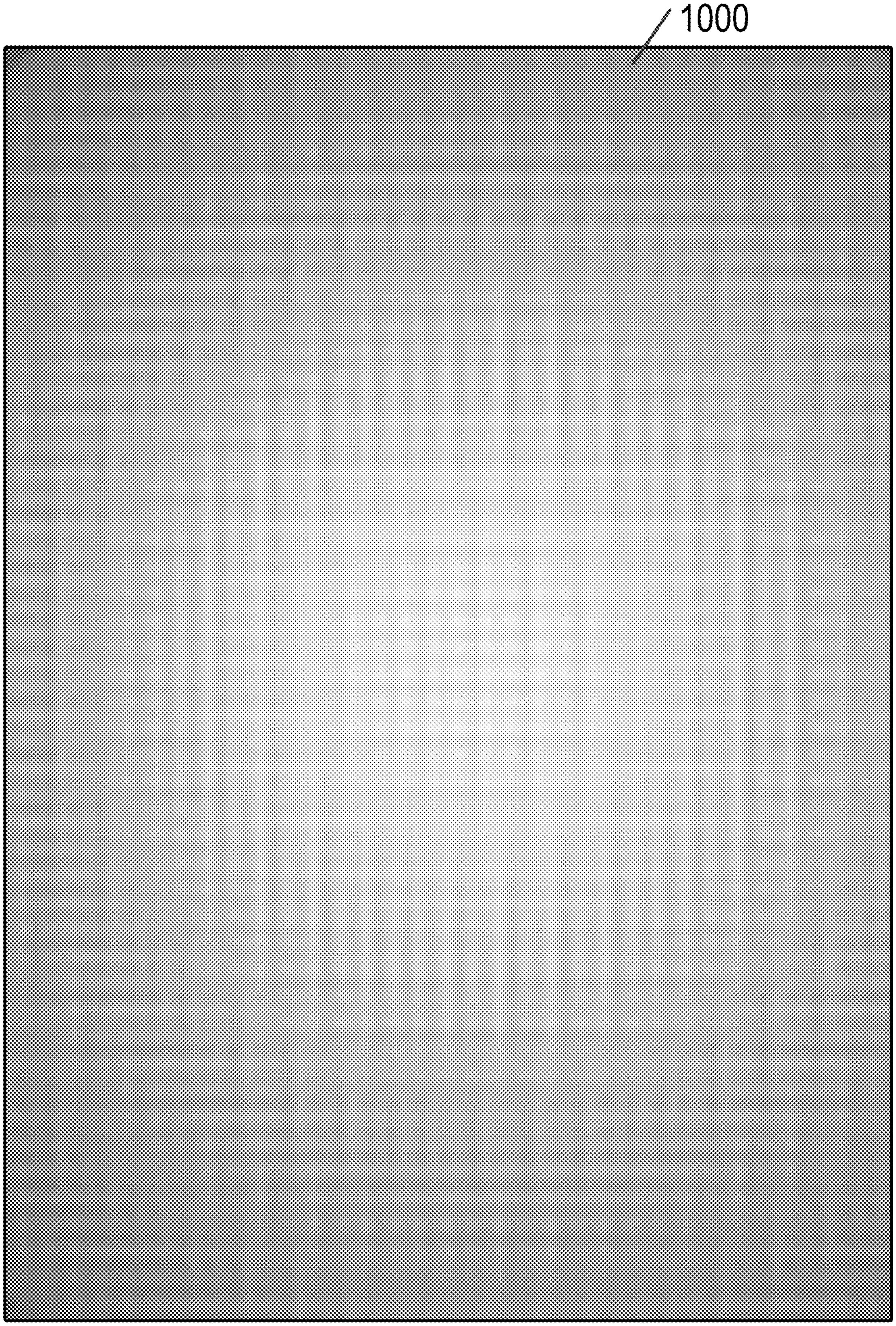
FIG. 10 depicts a synthetic flat field correction image created by stitching the attempted flat field correction image of FIG. 7 and the other attempted flat field correction image of FIG. 9 together.
Figure 11:
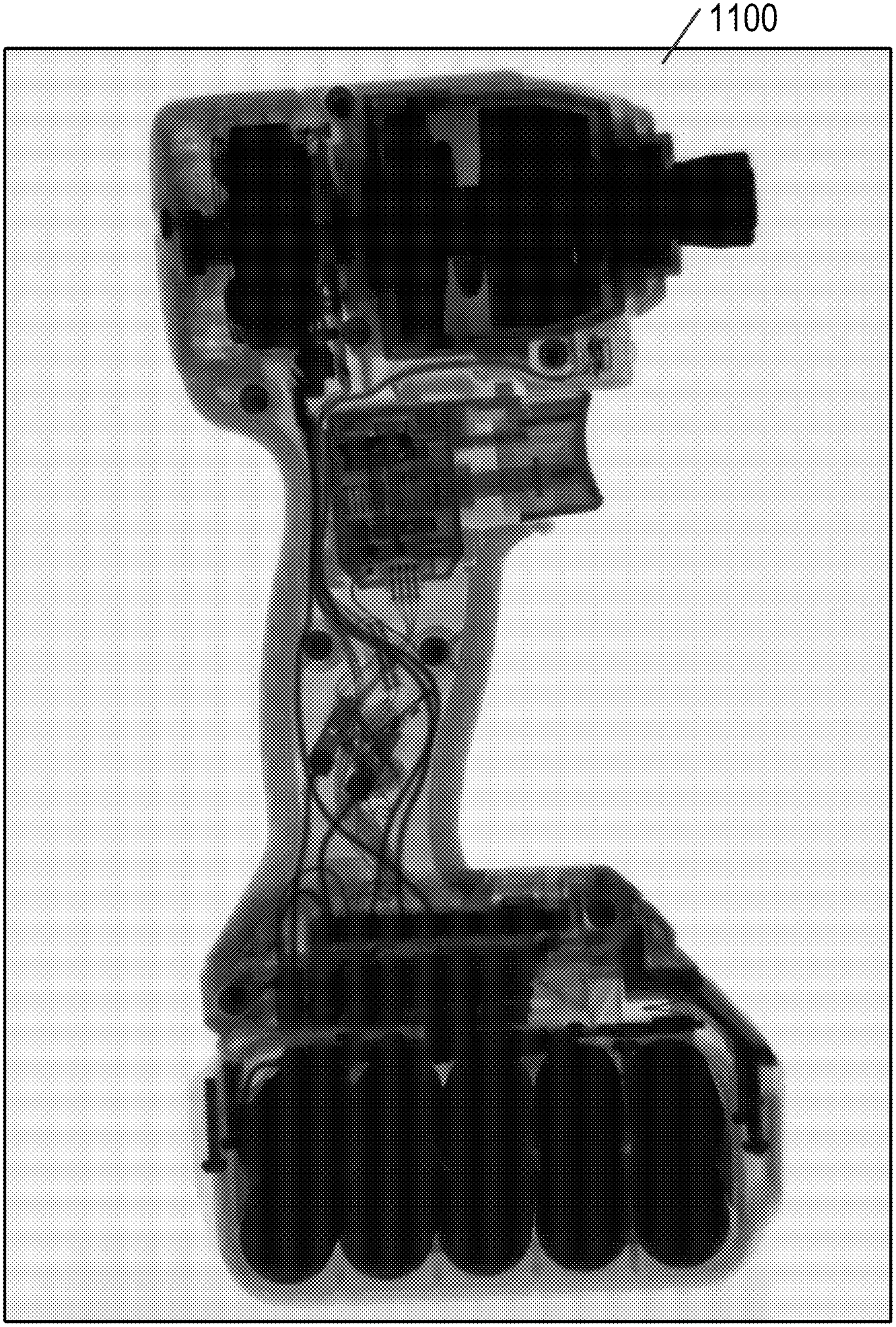
FIG. 11 depicts flat field correction of the radiograph of FIG. 6 using the synthetic flat field correction image of FIG. 10 as a bright correction image.

FIG. 9 depicts another attempted flat field correction image 900 with a defect. For example, the part is still partially in the view of the detector, e.g., on the lower right corner of the view of the detector, because there is not enough space inside the X-ray scanner to move the part completely outside the view of the detector. The X-ray scanner and/or a computer communicatively coupled with the X-ray scanner can generate a synthetic flat field correction image using the systems and the techniques described herein, thus solving the problem of having a scan object partially in the flat field correction image. FIG. 10 depicts the attempted flat field correction image 700 of FIG. 7 and the other attempted flat field correction image 900 of FIG. 9 stitched together to create a synthetic flat field correction image 1000 depicted as if the impact driver was completely out of view of the detector for the FFC image. In addition, FIG. 11 depicts flat field correction of the radiograph 600 of FIG. 6 using the synthetic flat field correction image 1000 of FIG. 10 as a bright correction image, resulting in the flat field corrected radiograph 1100.

At 103, for a pixel that was identified as a background pixel in at least n radiographs (e.g., n=10), the method can further include averaging together the value of pixels of all values that the pixel measured during all background images. As a result, a 2D image can be generated with averaged values at all pixels identified as a background pixel at least n times and no information for other pixels.

At 104, the method can further include fitting an inverse paraboloid to the background pixels in the generated image. In a coordinate system, the inverse paraboloid can be generated according to $$\text{Grey value} = \frac{1}{a(x-x_c)^2 + b(y-y_c)^2 + c},$$

wherein a, b, c, $x_c$, and $y_c$ are constants that correspond with the flux drop-off of X-ray energy as a function of distance from the X-ray source focal point, wherein a is a horizontal multiplier to $R^2$ dropoff rate, b is a vertical multiplier to $R^2$ dropoff rate, c is an inverse of the maximum grey value of the inverse paraboloid, $x_c$ is a horizontal distance from the origin of the coordinate system to the vertex of the inverse paraboloid, and $y_c$ is the vertical distance from the origin of the coordinate system to the vertex of the inverse paraboloid. Since the edges of the detector are further from the X-ray source focal point compared to the center of the detector, the edges can be dimmer in uncorrected radiographs. The generated 2D image can then display the full extent of the interior of the detector, which can be low-frequency information of the inferred bright FFC image. In some implementations, the method can further include inferring flat field information using the fit of the inverse paraboloid to the background pixels in the image.

In various example embodiments, FFC can be applied to the scan data using the image created by the inverse paraboloid. In general, FFC images can be collected using two settings: bright images can be collected with the source on at the settings that will be used for the scan, while dark images can be collected with the source off. Specifically, FFC correction with a bright FFC can be performed by dividing each pixel of the scan radiograph by each pixel of the correction image, and multiplying the result by a target brightness value (e.g., 60,000).

At 105, the method can include applying flat field correction (e.g., pixelated correction) using the synthetic flat field data to the at least one two-dimensional X-ray radiograph image. In some implementations, the method can include applying flat field correction using the synthetic flat field data to another scan data collected under a different scanner condition than the scanner condition of the at least one two-dimensional X-ray radiograph image.

In various example embodiments, the synthetic flat field data can include any combination of non-synthetic data (e.g., a radiograph image), incomplete data, partial data (e.g., a radiograph image of a scan object that is outside of the field of view of the X-ray scanner), and incorrect data. In some implementations, incorrect data can be a radiograph image that is collected under a different scanner condition than a scanner condition under which the X-ray radiograph image that the FFC applies to is collected. For example, the incorrect data can include a radiograph image for flat field correction collected under different scanner conditions than the scanner conditions of a scan of an object. The synthetic flat field data can be generated from the radiograph image that is collected under the different scanner conditions. The synthetic flat field image can be representative of the flat field data related to the scanner condition under which the X-ray radiograph image that the FFC applies to is collected. In some implementations, the different scanner conditions can include different X-ray source settings, e.g., different current conditions of the X-ray scanner, such as a high current condition and a low current condition. For example, the synthetic flat field data under a high current condition can be inferred from flat field data under a low current condition, or the synthetic flat field data under a low current condition can be inferred from flat field data under a high current condition. The inference can be based on a priori information indicating how the paraboloid that is used to generate the flat field data changes with respect to changes of the X-ray source settings, e.g., different current conditions.

For example, the scanner conditions can include different positions of a part motion system of the X-ray scanner. The synthetic flat field data can be generated from a radiograph image that is collected under a scanner condition when an object is moved to an extreme of the part motion system such that portions of the detector are exposed to the X-ray. The scanner condition used to capture a radiograph image of the object can be a condition when the object is not moved to the extreme of the part motion system and the detector is obscured by the object.

Synthetic flat field data can include data where conventional flat field data (i.e., taking multiple images without the object in view and averaging those images together) can be augmented with additional information or skipped entirely in the case of the inferred FFC.

Incorrect data can include when the object being scanned is accidentally in the detector field of view when the image is being captured. Partial and incomplete data can correspond to the entirety of the flat field image not being able to be captured at once; therefore, any single image can be incomplete, and the object can have to be moved to collect the required information. Non-synthetic data can be used to generate a synthetic flat field image, as discussed in more detail below.

Additionally or alternatively, synthetic flat field data can include any combination of data generated from a plurality of tests (e.g., generating a flat field image via interpolation from a look-up table based on a full factorial sweep of scan setup conditions), stitched data, and/or directly collected data (e.g., used to generate an inferred flat field from the scan itself rather than a previous FFC correction). For example, the plurality of tests can include generating directly collected radiograph images under a sweep of scanner conditions, e.g., the different scanner conditions discussed previously, and the collected radiograph images under the sweep of scanner conditions can be assembled, aggregated, and/or subsequently processed to generate the synthetic flat field data. This synthetic flat field data can be collected before or after the 2D radiographs are generated at 101.

In addition, the synthetic flat field data can include inferred data, which can be derived from the 2D radiographs generated at 101 that include the scan object. Specifically, inferred synthetic flat field data can include data inferred from at least one portion of a radiograph for empty field, and/or a predefined property associated with a representative field. For example, an X-ray scanner or a computer communicatively coupled with the X-ray scanner can be configured to obtain partial data where a part obscures part of a radiograph image, fit an inverse paraboloid to the background region of the radiograph image, and infer flat field information behind the part by replacing it with the intensity fit found from the inverse paraboloid. A representative field can be a flat field image unobscured by a part. Predefined properties associated with the representative field can be coefficients of the inverse paraboloid fits.

In addition, synthetic flat field data can include completely direct data, completely synthetic data, or a combination of direct data and synthetic data. Synthetic flat field data can also include any combination of at least one dark field image and at least one bright field image. For example, two flat field images can be used for FFC. The bright field image can be generated with no object and/or a partial object in the field of view, with the source on, and with the scanner set to the settings used for scan collection. The dark field image can be generated with no object and/or a partial object in the field of view and with the source off.

Data can be assembled by stitching together two or more conventionally generated flat field images. In some implementations, data can be assembled by stitching together two or more images where at least one of the two or more images is generated using the systems and techniques described in this application. For example, scanning a large object would not entirely leave the field of view of the detector, regardless of the position of the object. As a result, the conventional method of flat field data generation would result in an erroneous flat field. The assembled data disclosed herein can resolve this by moving the part to the left, and recording flat field data with at least half of the right side of the detector unobstructed. The part can then be moved to the right, and flat field data recorded with at least half of the left side of the detector unobstructed. The two images can then be stitched together, taking the unobstructed half from each, yielding a flat field image that is as if the flat field image was taken with an empty field.

The synthetic flat field data can indicate at least one of a low brightness condition (e.g., reduction in brightness of 10%), and a time of day condition (e.g., elapsed duration since an FFC measurement has been made). In addition, synthetic flat field data can include at least one pixel linearly sensitive to visible light, and can be configured for pixelated correction, e.g., pixel-by-pixel correction or a correction on a pixel-wise basis. For example, the pixelated correction can include a unique correction for each pixel. In some implementations, the flat field correction using the synthetic flat field data can be applied to one or more pixels linearly sensitive to visible light, one or more pixels non-linearly sensitive to visible light, or a combination of both. For example, every pixel can respond linearly to light input, e.g., in a camera detector of an X-ray scanner using complementary metal oxide semiconductor (CMOS) sensors, but every pixel can have a different linear response. Certain example embodiments can measure a representative bright empty field image and dark image, which can be used to correct each pixel so that, after applying the correction, all pixels will be 0 if no light is measured, and all pixels which see no object will be a constant value.

Figure 4:
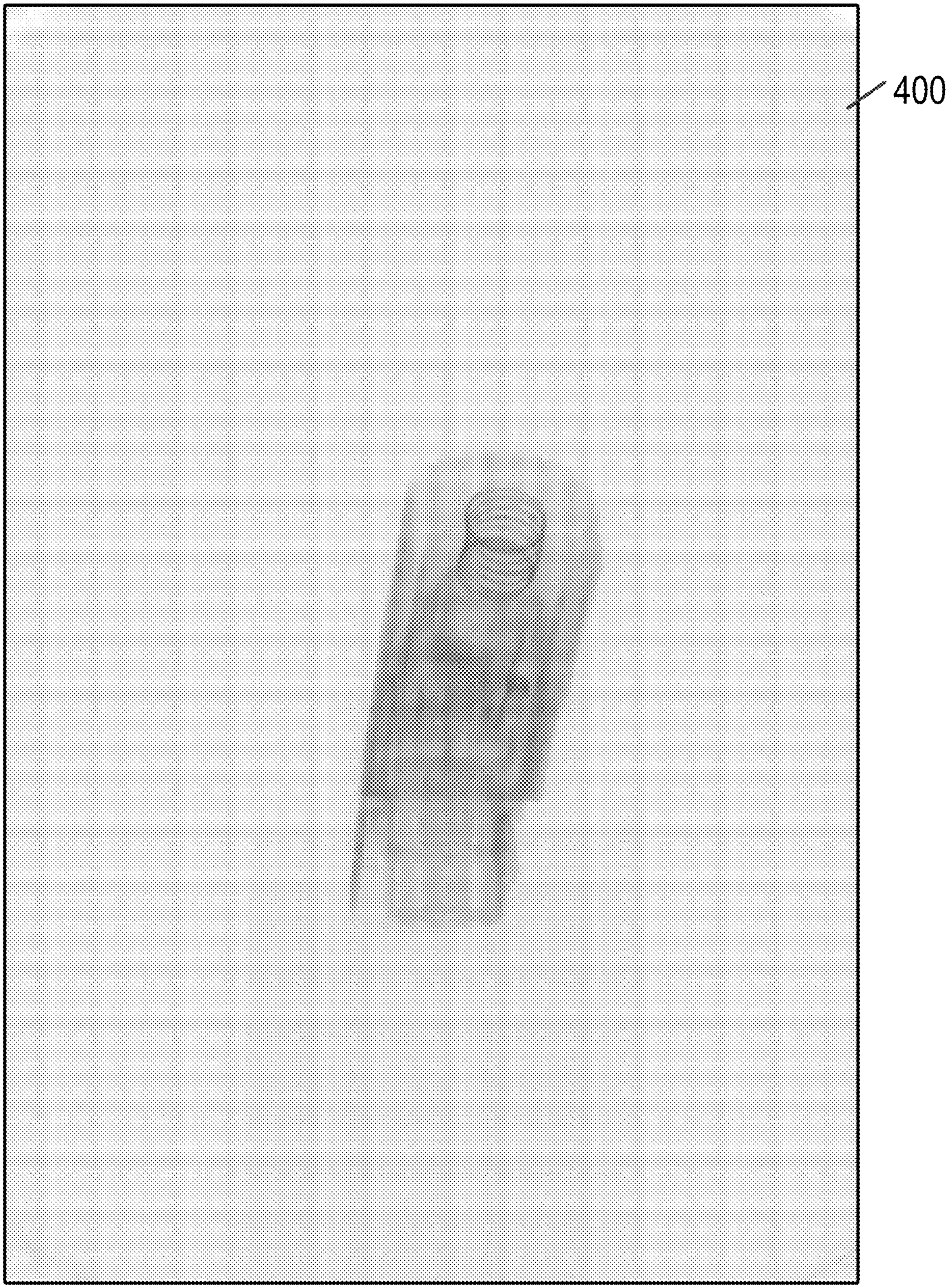
FIG. 4 depicts a corrected image with flat field correction applied to an uncorrected image of an asthma inhaler.

At 106, following the application of inferred FFC, in some implementations, the method can include attributing any remaining artifacts to fixed pattern noise due to the unique responsivity of each pixel, and generating a composite image, such an image 400 as shown in FIG. 4. This can be corrected by applying a ring artifact correction method. Since some or all pixels can be slightly miscalibrated, ring artifact correction can normalize pixels with respect to adjacent pixels, which can be representative of the fixed pattern noise still present after removal of the low-frequency non-uniformity.

FIG. 5 illustrates an example of an X-ray imaging system 500. The X-ray imaging system 500 includes a CT scanning device 510, which can be configured to perform CT imaging. The X-ray imaging system 500 can include a computer 512 communicatively coupled with the CT scanning device 510. The computer 512 can include a hardware processor, e.g., one or more processor(s) 514, and a non-transitory computer-readable medium, e.g., memory 516. The CT scanning device 510, the computer 512, or a combination of both can perform the flat field correction described herein. For example, the memory 516 of the computer 512 can encode instructions configured to cause the processor(s) 514 to perform the flat field correction described herein.

CT scanning device 510 can include scintillator 501, and X-ray source 502 configured to emit X-rays 503 through scan target 504 and onto front face 505 of scintillator 501. CT scanning device 510 can further include detector 506 configured to detect at least one fluorescence signal 507 (i.e., infrared, ultraviolet, or visible light) from rear face 508 of scintillator 501. In various example embodiments, detector 506 can be aimed directly at rear face 508 (as shown in FIG. 5), or scintillator 501 can be oriented perpendicularly with X-ray source 502.

In some example embodiments, scintillator 501 can include a substrate layer, which can be made of any of polycarbonate, polyacrylate, polyethylene terephthalate (PET), and barrier films comprising metal oxide.

In certain example embodiments, X-ray source 502 can be at least one of a sealed tube-based X-ray source, an open tube-based X-ray source, a cold-cathode X-ray source, a rotating anode X-ray source, a stationary anode X-ray source, a liquid metal anode X-ray source, and triboluminescent X-ray source.

Scan target 504 can include any of inorganic materials, organic materials, metals, plastics, composites, carbon, non-carbon, multi-component, and multi-layer parts.

In certain example embodiments, detector 506 can include any combination of a complementary metal-oxide-semiconductor (CMOS) digital camera sensor, a red-green-green-blue (RGGB) Bayer filter, an optical camera, a monochromatic optical camera, a back-side-illuminated sensor, a front-side-illuminated sensor, a charge-coupled device (CCD) detector, a photodiode, X-ray flat panel detector. In certain example embodiments, detector 506 can be configured to detect fluorescence signals 507 from front face 505 and/or rear face 508.

Any of the devices of the X-ray imaging system 500 can include at least one processor, which can be embodied by any computational or data processing device, such as a central processing unit (CPU), application specific integrated circuit (ASIC), or comparable device. The processors can be implemented as a single controller, or a plurality of controllers or processors.

At least one memory can be provided in one or more of the devices of the X-ray imaging system 500. The memory can be fixed or removable. The memory can include computer program instructions or computer code contained therein. Memory can independently be any suitable storage device, such as a non-transitory computer-readable medium. The term "non-transitory," as used herein, can correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory can be used. The memories can be combined on a single integrated circuit as the processor, or can be separate from the one or more processors. Furthermore, the computer program instructions stored in the memory, and which can be processed by the processors, can be any suitable form of computer program code, for example, a compiled or interpreted computer program written in any suitable programming language.

The processors and memories can be configured to provide means corresponding to the various blocks of FIG. 1. Although not shown, the devices can also include positioning hardware, such as GPS or micro electrical mechanical system (MEMS) hardware, which can be used to determine a location of the device. Other sensors are also permitted, and can be configured to determine location, elevation, velocity, orientation, and so forth, such as barometers, compasses, and the like.

The memory and the computer program instructions can be configured, with the processor for the particular device, to cause a hardware apparatus, such as UE, to perform any of the processes described above (i.e., FIG. 1). Therefore, in certain example embodiments, a non-transitory computer-readable medium can be encoded with computer instructions that, when executed in hardware, perform a process such as one of the processes described herein. Alternatively, certain example embodiments can be performed entirely in hardware.

In certain example embodiments, an apparatus can include circuitry configured to perform any of the processes or functions illustrated in FIG. 1. As used in this application, the term "circuitry" can refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software need not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In some example embodiments, the X-ray imaging system 500 (and any of the devices in the X-ray imaging system 500) can include means for performing a method, a process, or any of the variants discussed herein. Examples of the means can include one or more processors, memory, controllers, transmitters, receivers, and/or computer program code for causing the performance of the operations.

In various example embodiments, the X-ray imaging system 500 (and any of the devices in the X-ray imaging system 500) can be controlled by memory and a processor to adjust at least one operation parameter based upon a material composition of a scan target, calculate an exposure duration parameter per frame based on a total number of frames and a total time elapsed while collecting the frames, and collect at least one X-ray frame of the scan target based upon the at least one adjusted operation parameter and the calculated exposure duration parameter.

Certain example embodiments can be directed to an apparatus that includes means for performing any of the methods described herein including, for example, means for adjusting at least one operation parameter based upon a material composition of a scan target, calculating an exposure duration parameter per frame based on a total number of frames and a total time elapsed while collecting the frames, and collecting at least one X-ray frame of the scan target based upon the at least one adjusted operation parameter and the calculated exposure duration parameter.

The features, structures, or characteristics of example embodiments described throughout this specification can be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment can be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics can be combined in any suitable manner in one or more example embodiments.

Additionally, if desired, the different functions or procedures discussed above can be performed in a different order and/or concurrently with each other. Furthermore, if desired, one or more of the described functions or procedures can be optional or can be combined. As such, the description above should be considered as illustrative of the principles and teachings of certain example embodiments, and not in limitation thereof.

It will be readily understood that the components of certain example embodiments, as generally described and illustrated in the figures herein, can be arranged and designed in a wide variety of different configurations. Thus, the above detailed description of some example embodiments of systems, methods, apparatuses, and computer program products for nonintrusive scanning of objects using X-ray electromagnetic radiation is not intended to limit the scope of certain example embodiments, but is instead representative of selected example embodiments.

One having ordinary skill in the art will readily understand that the example embodiments discussed above can be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

Partial Glossary

CMOS Complementary metal-oxide-semiconductor
CT Computed Tomography
dB Decibel

FFC Flat-Field Correction
GV Grey Value
kV Kilovolt
mA Milliamp
ML Machine-Learning

We claim:

1. A method of flat field image correction, comprising:
generating at least one two-dimensional X-ray radiograph image;
for each radiograph image of the at least one two-dimensional X-ray radiograph image, identifying one or more regions of each radiograph image as corresponding with background, wherein one or more other regions of each radiograph image correspond with a scan object;
generating synthetic flat field data based on pixels at the one or more regions of each radiograph image of the at least one two-dimensional X-ray radiograph image corresponding with the background; and
applying flat field image correction using the synthetic flat field data to i) the at least one two-dimensional X-ray radiograph image, or ii) another two-dimensional X-ray radiograph image.

2. A method of flat field image correction, comprising:
generating at least one two-dimensional X-ray radiograph image;
generating synthetic flat field data using the at least one two-dimensional X-ray radiograph image, a second two-dimensional X-ray radiograph image, or both; and
applying flat field image correction using the synthetic flat field data to the at least one two-dimensional X-ray radiograph image,
wherein generating the synthetic flat field data comprises generating the synthetic flat field data using at least the second two-dimensional X-ray radiograph image of a scan object that is partially out of a field of view of an X-ray scanner that scans the scan object.

3. A method of flat field image correction, comprising:
generating at least one two-dimensional X-ray radiograph image;
generating synthetic flat field data using the at least one two-dimensional X-ray radiograph image, a second two-dimensional X-ray radiograph image, or both; and
applying flat field image correction using the synthetic flat field data to the at least one two-dimensional X-ray radiograph image,
wherein generating the synthetic flat field data comprises:
generating a two-dimensional image comprising background pixels that do not include a scan object, wherein the background pixels of the two-dimensional image are generated using one or more background pixels in the at least one two-dimensional X-ray radiograph image, the second two-dimensional X-ray radiograph image, or both;
fitting an inverse paraboloid function to the background pixels of the two-dimensional image; and
generating the synthetic flat field data using the inverse paraboloid function fit to the background pixels of the two-dimensional image.

4. The method of claim 3, wherein a pixel value of a background pixel of the two-dimensional image is an average of values of corresponding background pixels in at least two radiograph images.

5. The method of claim 1, wherein the synthetic flat field data comprises data generated from at least two radiograph images of the at least one two-dimensional X-ray radiograph image, wherein the at least two radiograph images are collected under different scanner conditions.

6. The method of claim 1, wherein the synthetic flat field data comprises data generated from stitched data.

7. The method of claim 1, wherein the synthetic flat field data comprises data generated from a plurality of radiograph images collected under a plurality of scanner conditions.

8. The method of claim 7, wherein generating the synthetic flat field data comprises generating the synthetic flat field data by assembling the plurality of radiograph images collected under the plurality of scanner conditions.

9. The method of claim 1, wherein the synthetic flat field data comprises inferred synthetic flat field data.

10. The method of claim 9, wherein the inferred synthetic flat field data comprises data inferred from at least one portion of a radiograph for empty field, and a predefined property associated with a representative field.

11. The method of claim 1, wherein the synthetic flat field data comprises at least one dark field image, at least one bright field image, or a combination thereof.

12. The method of claim 1, wherein the synthetic flat field data is associated with at least one of a low brightness condition, a low sensitivity condition, and a time of day condition.

13. A method of flat field image correction, comprising:
generating at least one two-dimensional X-ray radiograph image;
generating synthetic flat field data using the at least one two-dimensional X-ray radiograph image, a second two-dimensional X-ray radiograph image, or both; and
applying flat field image correction using the synthetic flat field data to the at least one two-dimensional X-ray radiograph image,
wherein the synthetic flat field data comprises at least one pixel linearly sensitive to visible light.

14. A method of flat field image correction, comprising:
generating at least one two-dimensional X-ray radiograph image;
generating synthetic flat field data using the at least one two-dimensional X-ray radiograph image, a second two-dimensional X-ray radiograph image, or both; and
applying flat field image correction using the synthetic flat field data to the at least one two-dimensional X-ray radiograph image,
wherein the synthetic flat field data is configured for pixelated correction.

15. A system comprising:
an X-ray scanner; and
a computer communicatively coupled with the X-ray scanner, wherein the computer comprises a hardware processor and a non-transitory computer-readable medium encoding instructions configured to cause the hardware processor to perform operations comprising:
receiving or generating at least one two-dimensional X-ray radiograph image from or using the X-ray scanner,
for each radiograph image of the at least one two-dimensional X-ray radiograph image, identifying one or more regions of each radiograph image as corresponding with background, wherein one or more other regions of each radiograph image correspond with a scan object,
generating synthetic flat field data based on pixels at the one or more regions of each radiograph image of the at least one two-dimensional X-ray radiograph image corresponding with the background, and applying flat field image correction using the synthetic flat field data to i) the at least one two-dimensional X-ray radiograph image, or ii) another two-dimensional X-ray radiograph image.

16. A system comprising:

an X-ray scanner; and a computer communicatively coupled with the X-ray scanner, wherein the computer comprises a hardware processor and a non-transitory computer-readable medium encoding instructions configured to cause the hardware processor to perform operations comprising:

receiving or generating at least one two-dimensional X-ray radiograph image from or using the X-ray scanner, generating synthetic flat field data using the at least one two-dimensional X-ray radiograph image, a second two-dimensional X-ray radiograph image, or both, and applying flat field image correction using the synthetic flat field data to the at least one two-dimensional X-ray radiograph image, wherein generating the synthetic flat field data comprises generating the synthetic flat field data using at least the second two-dimensional X-ray radiograph image of a scan object that is partially out of a field of view of the X-ray scanner that scans the scan object.

17. A system comprising:

an X-ray scanner; and a computer communicatively coupled with the X-ray scanner, wherein the computer comprises a hardware processor and a non-transitory computer-readable medium encoding instructions configured to cause the hardware processor to perform operations comprising:

receiving or generating at least one two-dimensional X-ray radiograph image from or using the X-ray scanner, generating synthetic flat field data using the at least one two-dimensional X-ray radiograph image, a second two-dimensional X-ray radiograph image, or both, and applying flat field image correction using the synthetic flat field data to the at least one two-dimensional X-ray radiograph image, wherein generating the synthetic flat field data comprises:

generating a two-dimensional image comprising background pixels that do not include a scan object, wherein the background pixels of the two-dimensional image are generated using one or more background pixels in the at least one two-dimensional X-ray radiograph image, the second two-dimensional X-ray radiograph image, or both;

fitting an inverse paraboloid function to the background pixels of the two-dimensional image; and generating the synthetic flat field data using the inverse paraboloid function fit to the background pixels of the two-dimensional image.

18. The system of claim 17, wherein a pixel value of a background pixel of the two-dimensional image is an average of values of corresponding background pixels in at least two radiograph images.

19. The system of claim 15, wherein the synthetic flat field data comprises data generated from at least two radiograph images of the at least one two-dimensional X-ray radiograph image, wherein the at least two radiograph images are collected under different scanner conditions.

20. A non-transitory computer-readable medium encoding instructions operable to cause a data processing apparatus to perform operations comprising:

generating at least one two-dimensional X-ray radiograph image;

for each radiograph image of the at least one two-dimensional X-ray radiograph image, identifying one or more regions of each radiograph image as corresponding with background, wherein one or more other regions of each radiograph image correspond with a scan object;

generating synthetic flat field data based on pixels at the one or more regions of each radiograph image of the at least one two-dimensional X-ray radiograph image corresponding with the background; and applying flat field image correction using the synthetic flat field data to i) the at least one two-dimensional X-ray radiograph image, or ii) another two-dimensional X-ray radiograph image.

* * * * *